United States Patent

Skelcey et al.

[11] Patent Number: 5,374,392
[45] Date of Patent: Dec. 20, 1994

[54] PROCESS FOR DENSIFICATION OF POWDERED CERAMICS AND CERMETS AT TEMPERATURES ABOVE 1400 DEGREES CENTIGRADE

[75] Inventors: James S. Skelcey, Midland; Craig J. Bartkowiak, Traverse City, both of Mich.

[73] Assignee: The Dow Chemical Company, Midland, Mich.

[21] Appl. No.: 802,384

[22] Filed: Dec. 4, 1991

[51] Int. Cl.$^5$ ............................................. B22F 3/14
[52] U.S. Cl. .............................................. 419/49; 419/48
[58] Field of Search ................................ 419/38, 48, 49

[56] References Cited

U.S. PATENT DOCUMENTS

| | | | |
|---|---|---|---|
| 3,253,936 | 5/1966 | Weindel | 106/64 |
| 3,356,496 | 12/1967 | Halley | 75/226 |
| 3,507,332 | 4/1970 | Venable, Jr. et al. | 166/292 |
| 3,607,325 | 9/1971 | Spangler et al. | 106/64 |
| 3,700,435 | 10/1972 | Chandhok | 75/214 |
| 3,748,158 | 7/1973 | Braniski et al. | 106/62 |
| 3,963,508 | 6/1976 | Masaryk | 106/104 |
| 4,428,906 | 1/1984 | Rozmus | 419/48 |
| 5,269,845 | 12/1993 | Grunau et al. | 106/692 |

*Primary Examiner*—Donald P. Walsh
*Assistant Examiner*—Daniel Jenkins
*Attorney, Agent, or Firm*—D. R. Howard

[57] ABSTRACT

Densify powdered materials, either ceramic or metal or both, at temperatures of 1400° C. or higher using a fluid die fabricated from a mixture of alumina and a calcium aluminate cement. The fluid die may be separated from a fluid pressure-transmitting medium by a barrier material such as graphite foil.

20 Claims, No Drawings

PROCESS FOR DENSIFICATION OF POWDERED CERAMICS AND CERMETS AT TEMPERATURES ABOVE 1400 DEGREES CENTIGRADE

BACKGROUND OF THE INVENTION

The present invention generally concerns consolidation of metallic and nonmetallic powders or combinations thereof to form a consolidated body of predetermined density. The present invention more particularly concerns the consolidation of such powders at temperatures in excess of 1400 degrees Centigrade. The present invention also concerns a monolithic die material suitable for use in consolidating the powders at such temperatures.

Consolidated, or high density as a percent of theoretical density, ceramic-containing bodies are useful in applications such as cutting, drilling and shaping hard materials. Hard materials include rock, metals and metal alloys.

Powdered materials, e.g., ceramic powders, are consolidated by several known procedures. These procedures typically begin by cold pressing the powdered material into a preform. As an alternative, the powdered material is hermetically sealed in a can. The powdered material, either as a preform or as the contents of a hermetically sealed can, is then subjected to consolidation pressure. Pressure may be applied either by mechanical means such as a forging press or by gaseous means such as a gas at superatmospheric pressure.

U.S. Pat. No. 4,428,906 discloses a pressure-transmitting medium prepared from a mixture of borosilicate glass and a refractory powder. The refractory powder consists of magnesium oxide, ammonium dihydrogen phosphate and silica powder in the form of quartz and cristobalite. The borosilicate glass and refractory powders are mixed with water to form a slurry that is cast into the shape of a die. The refractory powder and water react at ambient temperatures to form magnesium ammonium phosphate hexahydrate which acts as a cement to bind the glass and silica powders. The phosphate decomposes to an amorphous phase upon heating to about 250° Centigrade (° C.) during drying. Further heating of the die to about 1100° C. during preheating results in conversion of the amorphous phase to magnesium pyrophosphate or, if excess magnesium oxide is present, magnesium orthophosphate.

Dies prepared from the mixture of borosilicate glass and refractory powder provide satisfactory results at temperatures of from about 1100° C. up to about 1400° C. At higher temperatures, the magnesium phosphates react with the silica and glass to form magnesium silicates and volatile phosphorus oxides. Volatilization of the phosphorus oxides leaves behind a weakened, porous structure that is prone to premature collapse during handling. In addition, condensation of the phosphorus oxides on comparatively cooler surfaces within a heating furnace can lead to corrosion of furnace parts.

Some ceramic materials and cermets must be heated to temperatures in excess of 1400° C., e.g., 1600°–1975° C., in order to attain densities approaching theoretical density. As such, it would be desirable if there were a pressure-transmitting medium or fluid die material which would allow use of such higher temperatures.

SUMMARY OF THE INVENTION

One aspect of the present invention is a process for preparing dense, consolidated bodies of predetermined density which comprises subjecting, in a forging press, an isostatic die assembly to densification conditions of a temperature within a range of from greater than 1400° C. to about 1800° C., time and pressure sufficient to form a dense, consolidated body of desired shape, the die assembly comprising a powder body surrounded by a fluid pressure-transmitting medium, the medium and the preform being contained within a shell fabricated from a monolithic die material comprising an admixture of calcium aluminate cement and alumina, the fluid pressure-transmitting medium being substantially non-reactive with the monolithic die material at said densification conditions.

A second aspect of the present invention is a process for preparing dense, consolidated bodies of predetermined density which comprises subjecting, in a forging press, an isostatic die assembly to densification conditions of a temperature within a range of from greater than 1400° C. to about 1975° C., time and pressure sufficient to form a dense, consolidated body of desired shape, the die assembly comprising a powder body surrounded by a fluid pressure-transmitting medium, the medium and the preform being contained within a shell fabricated from a monolithic die material comprising an admixture of calcium aluminate cement and alumina, the shell is separated from the fluid pressure-transmitting medium by at least one layer of a barrier material that substantially precludes any reaction between the shell and the fluid pressure-transmitting medium.

The term "powder body", as used herein, refers to a preform as well as to a quantity of powdered material hermetically sealed in a can. When the can is formed from a metal, care must be taken to ensure that the metal does not melt or react with the powdered material at a temperature less than or equal to that employed to consolidate or densify the powdered material.

The term "monolithic", as used herein, refers to an article that is cast as a single piece or is formed without joints or seams.

DETAILED DESCRIPTION OF THE INVENTION

The process of the present invention is an improved process for consolidating powders. The powder to be consolidated can be one or more metals, one or more nonmetals, or mixtures of one or more metals with one or more nonmetals. The powder need not be pure or even substantially pure. It can include other materials, such as stabilizers or constituent elements. One such constituent element is carbon in the case of a refractory carbide. The powder is desirably a ceramic-containing powder or a mixture of ceramic-containing powders.

Ceramic materials suitable for consolidation by the process of the present invention include particulate materials having refractory characteristics. Typical refractory ceramic materials include refractory oxides, refractory carbides, refractory nitrides, refractory phosphides, refractory silicides, refractory borides, refractory sulfides and mixtures thereof. Other suitable refractory ceramic materials include mixed crystals such as sialons. Preferred refractory ceramic materials include refractory alumina, zirconia, magnesia, mullite, zircon, thoria, beryllia, urania, spinels, tungsten carbide, tantalum carbide, titanium carbide, niobium carbide, silicon carbide, aluminum nitride, titanium nitride, zirconium nitride, tantalum nitride, hafnium nitride, niobium nitride, boron nitride, silicon nitride, titanium boride, chromium boride, niobium boride, zirconium boride, tantalum boride, molybdenum boride, tungsten boride, cerium sulfide, molybdenum sulfide, cadmium sulfide, zinc sulfide, titanium sulfide, magnesium sulfide, zirconium sulfide and mixtures thereof. More preferred ceramic materials include alumina, silicon nitride, silicon carbide, mullite, cordierite, spinel, zirconia, titanium carbide and mixtures thereof. Ceramic materials include ceramic composites such as a composite of silicon carbide whiskers and alumina.

Metallic materials that can be employed alone or with ceramic materials include metals, metalloids, alloys and mixtures thereof. Typical metallic materials include cobalt, nickel, iron, tungsten, rhenium, steel, stainless steel, superalloys, molybdenum, tantalum, titanium, chromium, niobium, boron, zirconium, vanadium, palladium, hafnium, aluminum, copper, alloys thereof and mixtures thereof. Suitable metallic materials include cobalt, nickel, titanium, chromium, niobium, boron, palladium, hafnium, tantalum, molybdenum, zirconium, vanadium, aluminum, copper, alloys thereof and mixtures thereof. Additional suitable materials include magnesium, titanium aluminide, nickel aluminide, silicon, beryllium, germanium and mixtures and alloys of these. Desirable metallic materials include cobalt, chromium, nickel, titanium, niobium, palladium, hafnium, tantalum, aluminum, copper and mixtures thereof. Preferred metallic materials include cobalt, niobium, titanium and mixtures thereof. More preferred metallic materials include molybdenum, tungsten, tantalum, rhenium, niobium, vanadium, chromium, cobalt and mixtures and alloys of these with each other and other elements and compounds.

The densification or consolidation process beneficially applies mechanically induced pressure to a pressure-transmitting medium, such as glass, that is liquid at consolidation conditions to omnidirectionally consolidate materials. The mechanically induced pressure is desirably supplied by a forging press. The teachings of U.S. Pat. Nos. 4,428,906 and 4,389,362 relating to the application of mechanically induced pressure to a pressure transmitting medium to consolidate powdered materials are incorporated herein by reference.

Refractory calcium aluminate cements suitable for use in the process of the present invention may be prepared in accordance with U.S. Pat. No. 3,963,508, the teachings of which are incorporated herein by reference. Refractory cements, like portland cements, are made by admixing selected raw materials and then heating them to a temperature at which they react to form clinker with phases such as $CaAl_2O_4$, $CaAl_4O_7$ and $Ca_{12}Al_{14}O_{33}$. This clinker is then ground to a suitable size. Calcium aluminate cements are suitably finely ground admixtures of alumina and a clinker having $CaAl_2O_4$ as a major constituent. One such cement is commercially available from Aluminum Company of America under the trade designation CA-25C (casting grade). CA-25C, on a composition weight basis, constitutes 36 weight percent alumina, 43 weight percent $CaAl_2O_4$, 5 weight percent $CaAl_4O_7$, 6 weight percent $Ca_{12}Al_{14}O_{33}$ and 10 percent unspecified material.

At temperatures below 1900° C., the form of alumina is not critical and suitable results are obtained with tabular alumina. At temperatures greater than or equal to 1900° C., a superfine grade of alumina, such as ALCOA A-1000, provides optimal results. If desired, the superfine grade may be used at lower temperatures.

Alumina begins to react with calcium aluminate cement at a temperature of about 1000° C. As the temperature increases, the reaction proceeds at a faster rate and higher melting point reaction products begin to form. At a temperature of 1975° C., substantially all reactions of interest for purposes of the present invention may be regarded as complete.

The calcium aluminate cement and the alumina are suitably present in proportions sufficient to provide a refractory article or shell which meets three criteria. First, the article must deform while retaining substantially all of the fluid pressure-transmitting medium contained therein under densification conditions used to form dense, consolidated bodies. Second, the article must have sufficient structural integrity at such temperatures to allow the article to be transferred from a furnace to a forging press. Third, the article should, subsequent to application and release of densification pressure, fracture or fail in such a manner as to facilitate recovery of dense, consolidated bodies contained therein.

A refractory article cast from a water mixture of a calcium aluminate cement such as CA-25C would be expected, upon heating to temperatures in excess of 1400° C., to soften slightly at about 1450° C. as that is near $Ca_{12}Al_{14}O_{33}$'s melting point of 1455° C.

A greater amount of softening is expected at about 1600° C. as that is near $CaAl_2O_4$'s melting point of 1602° C. If an amount of sufficiently reactive alumina is present at temperatures in excess of 1600° C., the alumina will react with $CaAl_2O_4$ to form more complex calcium-aluminum-oxygen compounds with higher melting points, e.g., $CaAl_4O_7$ (melting point of about 1762° C.) and $CaAl_{12}O_{19}$ (melting point of about 1830° C.). The higher melting point compounds, if present in sufficient amounts, effectively increase the softening temperature of refractory articles. The increased softening temperatures, in turn, increase the temperature at which the refractory article can be used in the process of the present invention.

As projected use temperatures increase, mixtures of calcium aluminate cement and alumina desirably have increasing fractions of alumina. Table I provides general guidelines for mixtures in view of projected use temperatures. By varying the amount of alumina in the mixtures, it is possible to produce a fluid die that meets the three criteria for a satisfactory refractory article or shell.

TABLE I

| Projected Maximum Use Temperature (° Centigrade) | Weight Ratio of Calcium Aluminate Cement to Alumina |
| --- | --- |
| 1800 | 30:70 |
| 1850 | 15:85 |
| 1900 | 10:90 |
| 1975 | 5:95 |

If desired, projected use temperatures below 1600° C. may be obtained by admixing an amount of silica with the calcium aluminate and alumina. The actual amount may be determined without undue experimentation.

The pressure-transmitting medium in which a powder body is embedded can be any material or mixture of materials which is a liquid or fluid at the consolidation conditions. Several of these are known in the art. Typical media include certain glasses and salts, with glasses being preferred. Boron-containing glass is more preferred. The teachings of U.S. Pat. Nos. 4,446,100; 3,469,976; and 3,455,682 regarding glasses, salts, and other pressure-transmitting media are incorporated herein by reference. Pyrex TM glass and Corning Vycor TM glass, Corning 7931 borosilicate glass and sand (employed at temperatures above its melting point) provide satisfactory results.

Calcium aluminate and alumina can react with silica to form calcium aluminosilicate compounds such as anorthite ($CaAl_2Si_2O_3$) and gehlenite ($Ca_2Al_2SiO_7$), both of which melt at temperatures below 1600° C. If a calcium aluminate-alumina fluid die containing either glass or sand as the pressure-transmitting medium is held at a sufficiently high pre-heat temperature, calcium aluminosilicates begin to form where the die and pressure-transmitting medium interface. As the preheat temperature or time at that temperature or both increase, calcium aluminosilicate concentration also increases. Fluid die strength decreases concurrent with increases in calcium aluminosilicate content. Eventually, the fluid die softens and collapses in the absence of external pressure. Preheat temperatures in excess of 1800° C. particularly favor formation of calcium aluminosilicate compounds when Vycor TM glass is in contact with calcium aluminate-alumina compositions.

Reactions also occur between Pyrex TM glass and calcium aluminate-alumina fluid dies. The reactions occur at temperatures as low as 1500° C. In addition, reactions occur between Corning 7931 borosilicate glass and calcium aluminate-alumina fluid dies at temperatures in excess of 1700° C. Sand as a pressure-transmitting medium is used at temperatures above its melting point. At these temperatures, sand reacts with the calcium aluminate-alumina fluid dies.

One means of minimizing, if not eliminating, formation of calcium aluminosilicate compounds or other undesirable reaction products requires placing a barrier between inner surfaces of a fluid die and the pressure-transmitting medium. One such barrier material is a graphite foil such as that commercially available from Union Carbide under the trade designation Grafoil TM. A foil thickness of 0.020 inch (0.51 mm) provides particularly satisfactory results. Multiple plies of thinner foils provide satisfactory results, but present handling difficulties.

Any combination of pressure, temperature and time under which the desired consolidation takes place can be employed. The actual pressure, temperature and time required to achieve the desired results depend upon the particular material being densified as well as the apparatus used to effect consolidation. Those skilled in the art can choose the satisfactory pressures, temperatures and times based upon well-known criteria without undue experimentation.

Powders being consolidated via the process of the present invention are beneficially converted to preforms prior to densification. Preforms are readily prepared using technology familiar to the powder metals or ceramics industry. The teachings of U.S. Pat. No. 4,446,100 that relate to preforms are incorporated herein by reference.

General Procedure for Preparing a Fluid Die

The following powders are added to the mixing bowl of a Hobart mixer to prepare a fluid die: 1.73 pounds (0.78 kg) calcium aluminate cement, commercially available from Alcoa under the trade designation CA-25C; 2.01 pounds (0.91 kg) −48 mesh (Tyler Sieve Series) (300 μm maximum particle size) tabular alumina; and 2.01 pounds (0.91 kg) −14+28 mesh (Tyler Sieve Series) (600 μm to 1.18 mm particle size) tabular alumina. If the alumina is a superfine grade, such as ALCOA A-1000, the alumina and the calcium aluminate cement should be added last. After dry blending the powders for two minutes, 315 cc of warm 100° F. (37.8° C.) are added to the mixing bowl. Mixing continues for a period of 1.5 minutes. The mixer is stopped and the contents of the mixing bowl are manually stirred to incorporate dry powders from the bottom of the bowl that are not affected by the mixer beaters. The mixer is restarted and the contents are blended for an additional minute. After stopping the mixer once again for manual stirring, the mixer is restarted for a final minute of blending.

The mixture or cement slurry is poured into a fluid die mold situated on a vibrating table. The vibration promotes removal of entrapped air pockets. The filled mold is placed in a humidity controlled oven set at 90° F. (32.2° C.) and 90% relative humidity for a period of 24 hours to harden the cement. The hardened fluid die is removed from the mold and calcined in a furnace programmed to heat from ambient temperature to a temperature of 1470° F. (798.8° C.) at a rate of about 4.5° F./minute (2.5° C./minute) over a period of five hours and remain at that temperature for an additional three hours. Upon cooling to ambient temperature, the fluid die is ready for use.

The foregoing procedure yields a 30% calcium aluminate cement/70% alumina fluid die. Other suitable fluid dies result from appropriate adjustments to the amounts of calcium aluminate cement and tabular alumina powders.

General Procedure for Using the Fluid Die to Densify a Ceramic Preform

The article or powder body to be densified is embedded in a material which acts as a viscous liquid at process temperature and which serves to isostatically densify the article when both are confined and compressed in a closed cavity with a ram. The material which acts as a pressure transmitting medium is suitably silica sand or a glass having a viscosity at densification temperature that is high enough to minimize, if not eliminate, penetration by the glass into the embedded article or powder body during densification. One such glass is Corning Vycor TM glass.

After embedding the article or powder body in the material to be used as a pressure-transmitting medium, the fluid die is capped with a cover or lid made from the same composition as the fluid die. The lid isolates the pressure-transmitting medium from furnace conditions, such as those present in a graphite furnace containing an oxygen-free atmosphere, which favor chemical reduction reactions. Without a lid, exposure of silica contained in the glass or sand used as a pressure-transmitting medium produces silicon suboxides. The silicon suboxides tend to condense on furnace surfaces and react with the graphite. The reaction with graphite results in erosion of the furnace insulation.

The capped and filled fluid die is placed in a furnace and heated to 1100° C. at a rate of 20° C./minute and held there for 15 minutes. An alternative procedure involves heating to 1000° C. at a rate of 5° C./minute to 30° C./minute. The die is then heated to a temperature selected for consolidation or compaction, e.g., 1800° C., at a rate of 10° C./minute and held there for 15 to 30 minutes. The heated die is then transferred to a forging press where it is compressed with a ram up to 120,000 psi (830 MPa) for a period of time sufficient to attain a predetermined density. The predetermined density may vary from as low as fifty percent (50%) of theoretical density to a density approximating theoretical density. The predetermined density more typically is 95 percent of theoretical density or higher. The predetermined density is preferably equivalent to theoretical density. The period of time may be as short as 0.5 second or as long as a two or three hours. Typical periods of time are much shorter than three hours. Satisfactory results are obtained with periods of time varying from as little as 0.5 second to as long as 60 seconds. The pressing procedure is described in more detail in U.S. Pat. Nos. 4,744,943; 4,428,906; and 4,656,002, the teachings of which are incorporated herein by reference. The fluid die is cooled in air and the resultant densified article is recovered using conventional technology and sand blasted. The die itself tends to crack severely upon cooling. As such, it is readily removed.

The following examples illustrate the invention and do not, either explicitly or by implication, limit its scope. All parts and percentages are by weight unless otherwise indicated. Metric units given in parentheses are approximate equivalents of English units.

EXAMPLE 1

A starting powder mixture of 48% tantalum nitride, 32% zirconium diboride and 20% tungsten carbide is intensely mixed, in the presence of heptane, in an attritor containing tungsten carbide-cobalt balls for 8 hours. About 2-3 percent paraffin wax is added as a binder during the last thirty minutes of attritor mixing. The resultant mixture is dried and screened through a 20 mesh screen. A greenware part is made by cold-pressing the mixture which passes through the screen in steel tooling at 34,000 pounds per square inch (psi) (234 MPa). The cold-pressed part is then cold isostatically pressed at 30,000 psi (210 MPa). The resultant part is dewaxed under vacuum at 380° C.

The dewaxed part is spray coated with three layers of boron nitride and wrapped in boron nitride coated graphite foil. The wrapped part is placed into a 30% calcium aluminate/70% alumina fluid die prepared as described herein and embedded in Vycor TM brand glass. The die, after being capped with a lid as described herein, is preheated to a temperature of 1659° C. and pressed at 120,000 psi (830 MPa) for 30 seconds. The fluid die is cooled in air and the part is recovered and sand blasted. The part has a density of 69.4% of theoretical density.

EXAMPLE 2

The procedure of Example 1 is duplicated for a starting powder mixture of 4.8% niobium diboride and 95.2% titanium diboride. The recovered part has a density of 79% of theoretical density.

EXAMPLES 3 AND 4

The procedure of Example 1 is replicated save for using a ball mill instead of an attritor for two powder mixtures. One mixture is 97.1% titanium diboride and 2.9% tungsten boride. The other mixture is 94% zirconium diboride and 6% tungsten. The recovered parts have respective densities of 77 and 67.6% of theoretical density.

EXAMPLES 5 AND 6

The procedure of Example 1 is replicated save for lining a fluid die with a 0.020 inch (0.51 mm) layer of graphite foil and increasing the preheat temperature to 1800° C. for three powder compositions. One composition is 100% molybdenum disilicide. A second composition is 61.2% tungsten disilicide and 38.8% molybdenum disilicide. A third composition is 88.7% molybdenum disilicide and 11.3% silicon carbide. The recovered parts have respective densities of 93.1%, 98.4 and 96.1% of theoretical density.

EXAMPLE 7

The procedure of Example 1 is duplicated save for increasing the preheat temperature to 1800° C. for a powder mixture of 94% tungsten carbide and 6% tungsten metal. The recovered part has a density of 99.1% of theoretical density.

EXAMPLE 8

A powder mixture of 65.4% aluminum oxide and 34.6% titanium carbide is converted to a dewaxed part via the procedure of Example 1. The dewaxed part is wrapped in two overlapping layers of graphite foil. The wrapped part is placed into a 15% calcium aluminate/85% alumina fluid die prepared as described herein and embedded in Vycor TM brand glass as in Example 1. The die, after being capped with a lid as in Example 1, is preheated to a temperature of 1850° C. and pressed at 120,000 psi (830 MPa) for 60 seconds. The recovered part has a density of 100% of theoretical density, as calculated based on a linear rule of mixtures.

The foregoing examples demonstrate the suitability of calcium aluminate/alumina mixtures for use in fabricating fluid dies. Similar results are expected with other compositions and operating conditions, all of which are disclosed herein.

What is claimed is:

1. A process for preparing dense, consolidated bodies of predetermined density by subjecting an isostatic die assembly that comprises a shell containing a powder body surrounded by a fluid pressure-transmitting medium to densification conditions, the densification conditions including a temperature within a range of from greater than 1400° C. to about 1800° C., a time and a pressure, sufficient to convert the powder body into a dense, consolidated body of desired shape, the shell being fabricated from a monolithic die material comprising an admixture of calcium aluminate cement and alumina.

2. The process of claim 1, wherein the monolithic die material comprises an admixture of calcium aluminate cement and alumina.

3. The process of claim 2 wherein the calcium aluminate cement and the alumina are present in proportions sufficient to provide a shell that deforms while retaining substantially all of the fluid pressure-transmitting medium under the densification conditions.

4. The process of claim 3 wherein the proportions are from about 5 to about 80 parts by weight of calcium aluminate cement and from about 95 to about 20 parts by weight of alumina.

5. The process of claim 3 wherein the proportions are from about 5 to about 40 parts by weight of calcium aluminate cement and from about 95 to about 60 parts by weight of alumina.

6. The process of claim 1 wherein the fluid pressure-transmitting medium is separated from the shell by at least one layer of a barrier material.

7. The process of claim 6 wherein the barrier material is a graphite foil.

8. The process of claim 1 wherein the predetermined density is from 50 to 100% of theoretical density.

9. The process of claim 1 wherein the predetermined density is greater than 95% of theoretical density.

10. The process of claim 1, wherein the fluid pressure-transmitting medium is substantially nonreactive with the monolithic die material at the temperature and pressure.

11. The process of claim 1, wherein the pressure is applied with a forging press.

12. An isostatic die assembly that can withstand temperatures within a range of from greater than 1400° C. to about 1975° C., the assembly comprising a shell that contains a fluid pressure-transmitting medium and a powder body, the powder body being surrounded by the medium, the shell being fabricated from a monolithic die material that comprises an admixture of calcium aluminate cement and alumina.

13. The isostatic die assembly of claim 12, wherein the fluid pressure-transmitting medium is separated from the shell by at least one layer of a barrier material.

14. The isostatic die assembly of claim 12, wherein the barrier material is a graphite foil.

15. The isostatic die assembly of claim 12, wherein the calcium aluminate cement and the alumina are present in proportions sufficient to provide a shell that deforms while retaining substantially all of the fluid pressure-transmitting medium when subjected to applied pressure at a temperature of from greater than 1400° C. to 1975° C.

16. The isostatic die assembly of claim 15, wherein the proportions are from about 5 to about 80 parts by weight of calcium aluminate cement and from about 95 to about 20 parts by weight of alumina.

17. The isostatic die assembly of claim 15, wherein the proportions are from about 5 to about 40 parts by weight of calcium aluminate cement and from about 95 to about 60 parts by weight of alumina.

18. A process for preparing dense, consolidated bodies of predetermined density by subjecting an isostatic die assembly comprising a shell that contains a powder body surrounded by a fluid pressure-transmitting medium, the medium being separated from the fluid pressure-transmitting medium by at least one layer of a barrier material that substantially precludes any reaction between the shell and the fluid pressure-transmitting medium, to densification conditions that include a temperature within a range of from greater than 1400° C. to about 1975° C., a time and a pressure sufficient to form a dense, consolidated body of desired shape, the monolithic die material comprising an admixture of calcium aluminate cement and alumina.

19. The process of claim 18 wherein the barrier material is a graphite foil.

20. The process of claim 18, wherein the temperature is from about 1600° C. to about 1975° C.

* * * * *